United States Patent [19]

Elliott

[11] Patent Number: 4,461,269

[45] Date of Patent: Jul. 24, 1984

[54] STONECUTTER SPROCKET HAVING REPLACEABLE CARBIDE STEEL TEETH

[75] Inventor: David W. Elliott, Bedford, Ind.

[73] Assignee: Elliott Stone Company, Inc., Bedford, Ind.

[21] Appl. No.: 352,756

[22] Filed: Feb. 26, 1982

[51] Int. Cl.³ .............................................. B28D 1/04
[52] U.S. Cl. ....................................... 125/21; 30/384; 474/157
[58] Field of Search ............... 474/162, 157, 156, 155, 474/153; 198/730; 125/21; 30/384

[56] References Cited

U.S. PATENT DOCUMENTS

| 995,269 | 6/1911 | Maurino | 125/21 |
| 3,087,350 | 4/1963 | Reed | 474/157 |
| 3,659,908 | 5/1972 | Comellas | 474/156 |
| 4,308,019 | 12/1981 | Horkey | 474/162 |

FOREIGN PATENT DOCUMENTS

| 79878 | 9/1955 | Denmark | 474/156 |
| 158482 | 4/1951 | Sweden | 474/153 |

Primary Examiner—Harold D. Whitehead
Attorney, Agent, or Firm—Donald L. Cox

[57] ABSTRACT

A stone block, cutting chain saw having an improved drive sprocket and chain link design is disclosed. The sprocket itself is formed using rectangular, preferably square, shaped teeth which engage corresponding receiving areas on the cutting chain. In the preferred embodiment, the teeth are formed of carbide steel. The sprocket having the improved teeth design is rotably attached to a drive shaft. The cutting chain continuously revolves around the drive sprocket and at least a second sprocket, so that rotary motion over both sprockets enables the continuous cutting of stone, rock, coal and the like.

16 Claims, 3 Drawing Figures

STONECUTTER SPROCKET HAVING REPLACEABLE CARBIDE STEEL TEETH

BACKGROUND OF INVENTION

This invention relates to devices for cutting stone, rock, coal or other hard materials. More particularly this invention relates to stonecutters employing chain-like cutting heads.

The cutting of limestone, rock, coal and other hard materials, using chain sawing devices has been known for many years. These devices are normally designed to include a continuous chain having stone cutting links based along its outer edge. The chain, in turn, rotates about a drive sprocket and one or more additional sprockets. However, one of the major problems with these devices has been the extreme wear to which the teeth on the sprockets, particularly the drive sprocket, are subject.

Various sprocket designs have been suggested which allow for the rotation or removal of particular worn or defective sprocket teeth. For example, in U.S. Pat. No. 3,381,354, a sprocket is described whereby the teeth may simply be reversed to provide another driving face. See also U.S. Pat. No. 1,643,472. In U.S. Pat. No. 1,630,313, the replacement of sprocket teeth is provided, but no specific method for accomplishing this step is disclosed. See also U.S. Pat. No. 4,089,406. Document No. 2073, dated June 15, 1867, discloses some sort of drive device, but it is not clear whether this device is designed for use with a chain, and there is no description of the composition of the materials used.

In view of the serious and costly problems encountered with prior art stonecutting devices, it is an object of this invention to prepare devices which are not readily subject to sprocket wear.

It is another object of this invention to prepare sprockets which may be used repeatedly and for long periods of time without undue wear or malfunction.

Yet another object of this invention is to prepare stonecutting devices utilizing sprocket teeth which may readily be replaced without replacement of the entire sprocket.

These and other objectives are obtained using the device disclosed in this invention.

SUMMARY OF INVENTION

The instant invention involves a chain-driven stonecutting device utilizing a drive sprocket, having generally rectangularly shaped teeth arranged about the periphery of a sprocket wheel, said teeth being mounted so that they may be removed or rotated and another face of the tooth substituted on the sprocket wheel. The sprocket teeth engage with coresponding teeth-receiver areas on a cutting chain which revolves around the drive sprocket and around at least a second sprocket.

DESCRIPTION OF THE PREFERRED EMBODIMENTS

Figure 1:
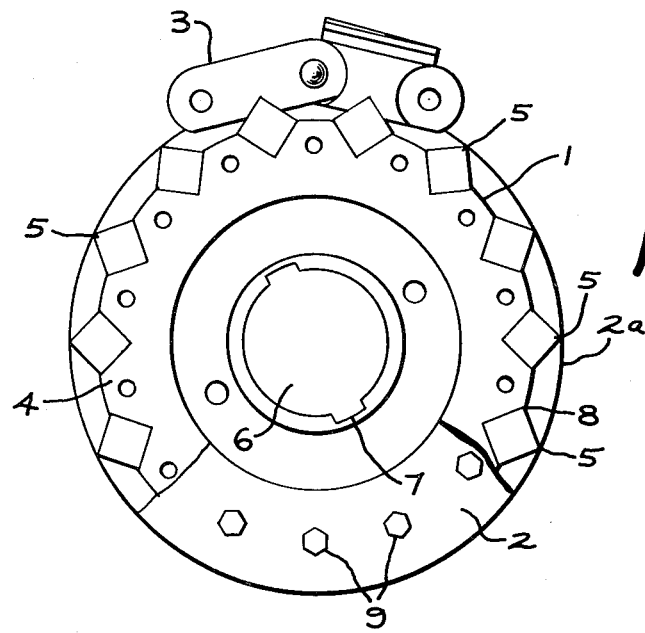
FIG. 1 is a cutaway side view of the sprocket of this invention.

In FIG. 1 the sprocket (1) described herein is pictured. The sprocket itself is formed in a preferred embodiment of three separate parts, as shown in FIG. 1. The first part is a first sideplate (2) which is employed in conjunction with a second sideplate (2a) to provide a channel in which the cutting chain (3) may travel. Located within that channel is the sprocket wheel (4) which is generally circular in shape and provided with sprocket teeth (5) arranged around its periphery. The sprocket wheel is attached to an axle, preferably using a shaft receiver area (6). The shaft inserted into this area may be the drive shaft which is engaged with a saw driving means, such as a gasoline, diesel or electric motor. In a preferred embodiment, the drive shaft receiver area is provided with means for securing the draft shaft (7) (e.g., the drive shaft may be fluted, or it may have other means which restrict its rotation within the receiver area). A similar opening may be provided in each sideplate, so that the drive shaft may be inserted through both side plates, as well as the sprocket wheel.

The teeth (5) arranged completely about the periphery of the sprocket wheel, are positioned in teeth-mounting areas (8). These areas are of corresponding shape to the teeth and are designed so that when the teeth become worn, they may be removed from the mounting area and turned, so as to expose a different tooth face to the chain. The teeth are seated in the receiver areas so that one corner of the rectangle (or square) extends in an outward fashion from the center of the wheel to form an extended, pointed tooth which is generally perpendicular to a tangent to the circular wheel at the midpoint of the tooth's extension beyond the face of the wheel.

In actual use, only one of the two available faces of the rectangular tooth being used will be subject to wear. This will be the face located toward the direction of rotation of the sprocket wheel when the sprocket wheel acts as a drive sprocket, and in the opposite direction when the sprocket freely rotates. When it is desired to replace a worn tooth, instead of totally removing the tooth, the tooth may simply be turned so that another face is exposed to the chain.

The teeth may be attached to the sprocket wheel within the teeth mounting areas by any convenient means. In one method, individual teeth are simply brazed or welded into place and may be removed and turned by melting the weld or brazing. In another embodiment, the teeth may be attached by a screw means or other conventional fastening arrangement, and may be removed by simply undoing the fastener.

The teeth, in order to provide the preferred design of this invention, should be of generally rectangular, preferably generally square, shape. This shape provides the most efficient drive means, while at the same time reducing possible tooth wear. The teeth should preferably be formed of carbide steel, although other similar materials which possess a high degree of wear resistance may also be employed.

The sprocket, which preferably is comprised of two sideplates and the sprocket wheel, is held together by a plurality of fasteners, such as screw means (9). Thus, by tightening bolts or otherwise attaching the three sides together, it is possible to hold the sideplates and the sprocket wheel firmly in place.

Figure 2:
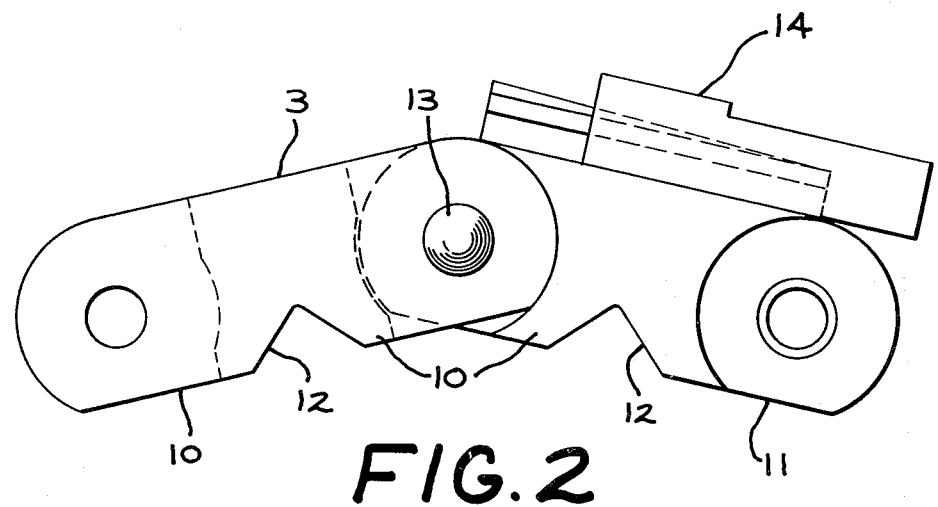
FIG. 2 is a side view of two of the chain lengths used in the instant invention.

Two links of the cutting chain (3) are shown in FIG. 2. The chain itself comprises two different types of links (10) and (11), although differing types of chain links may be employed without departing from the spirit of this invention. The only key element is that at least some, preferably all, of the links must be provided with teeth receiver areas (12) corresponding in part to the shape of the teeth (5) which are attached around the periphery of the sprocket wheel.

Therefore, teeth receiver areas will be shaped so as to correspond to the outer periphery of a portion of two sides of a sprocket tooth. The length of the sides of the receiver area should be no greater than the length of the side of the sprocket teeth which are in contact with the receiver. However, it is possible that the sides of the receiver areas may be of shorter length without departing from the scope of this invention.

In an alternative embodiment of this invention, the sprocket may be comprised of the sprocket wheel with the teeth arranged about its periphery and with the sideplates eliminated. If this arrangement is chosen, chain link sideplates must be employed. These sideplates enclose the sides of the teeth receiver areas on each chain link, so as to confine the sprocket teeth in contact with chain links to the teeth receiver area.

The chain links (10) and (11) are attached rotably at point (13) to allow partial rotary movement and bending of the chain so that the chain itself may fit snugly and securely around the sprocket. The amount of rotary movement necessary at point (13) depends upon the size of the sprocket (1). When extremely large sprockets are utilized, the amount of rotary motion necessary at point (13) is small, while with small sized sprockets, a larger amount of rotary motion is required. In order to reduce the wear on individual chain links, it is possible to form all or at least a part of the teeth receiver area from carbide steel or other similar materials as described above.

At least a portion of the chain links employed in this invention are provided with a abrading or cutting means (14). The abrading or cutting means may be a steel, diamond or other hard substance which abrades or cuts the stone.

Figure 3:
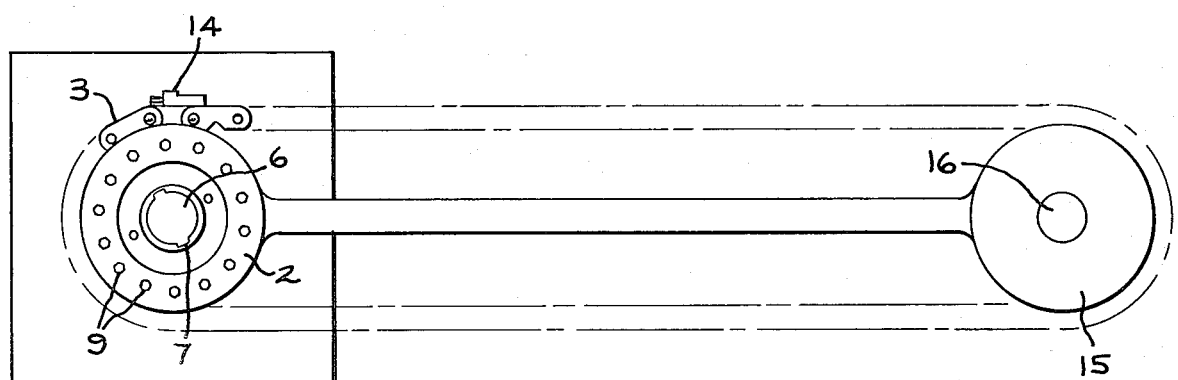
FIG. 3 is a side view of the chain cutting device of the instant invention.

An additional component employed in this invention is a second sprocket (15) shown in FIG. 3. This sprocket may be of similar design to the drive sprocket, or it may be of an entirely different design. The second sprocket is attached to a freely-rotating axle (16), and preferably no direct drive is imparted to this second sprocket. For this reason, the wear forces to which the teeth of the second sprocket are subject are not nearly as great as those to which the drive sprocket is subject. Additional freely rotating sprockets may also be employed in the cutters of the instant invention, particularly where extremely long cutting chains are used.

In actual operation, the ends of the cutting chain are attached to each other to for a continuous loop, and the chain is placed around the drive sprocket and the freely rotating sprocket to provide a continuous cutting edge. When it is desired to cut a particular stone block, drive is imparted to the drive sprocket and the cutting chain is thereby activated and slowly brought into contact with the stone to be cut. During actual cutting, it is preferable to utilize oil, water, or other cooling means, so that the chain does not overheat.

By employing the device of this invention it is possible to utilize the same sprocket indefinitely without replacement. When the sprocket teeth do finally become worn, they may simply be rotated within the teeth receiver areas. When each face of a tooth is finally worn, a new tooth may be substituted on the sprocket.

What is claimed is:

1. A sprocket for a stonecutter comprising a generally circular wheel, having teeth mounting areas arranged about the periphery of said wheel and generally square shaped teeth removably attached in said teeth mounting areas, so that a corner of each square tooth extends outwardly from the center of the wheel.

2. The sprocket of claim 1 in combination with sideplates attached to the sprocket wheel so as to form a chain channel.

3. The sprocket of claim 1 wherein the teeth are square in shape.

4. The sprocket of claim 1 wherein the teeth are formed of carbide steel.

5. The sprocket of claim 2 wherein the teeth are formed of carbide steel.

6. The sprocket of claim 3 wherein the teeth are formed of carbide steel.

7. A stonecutter saw comprising:
   (a) a saw driver means engaged with a drive shaft attached to a drive sprocket in the form of a wheel having a plurality of generally square shaped teeth removably attached to the periphery of said wheel so that a corner of each square tooth extends outwardly from the center of said wheel;
   (b) a cutting chain having teeth receiver areas for engagement with said corners of said square shaped teeth; and
   (c) at least a second sprocket for engagement with the cutting chain, so as to allow continuous rotation of the cutting chain around the drive sprocket and the second sprocket.

8. The saw of claim 7 wherein said sprocket wheel includes teeth mounting areas.

9. The saw of claim 7 wherein the drive sprocket is formed of sideplates arranged on either side of the sprocket wheel, so as to form a channel in which the cutting chain is guided.

10. The saw of claim 7 wherein the teeth are square in shape.

11. The saw of claim 7 wherein the second sprocket is of the same configuration as is the drive sprocket.

12. The saw of claim 7 wherein the teeth are formed of carbide steel.

13. The saw of claim 8 wherein the teeth are formed of carbide steel.

14. The saw of claim 9 wherein the teeth are formed of carbide steel.

15. The saw of claim 10 wherein the teeth are formed of carbide steel.

16. The saw of claim 11 wherein the teeth are formed of carbide steel.

* * * * *